United States Patent [19]
Kaiser, deceased

[11] 4,043,567
[45] Aug. 23, 1977

[54] STEERING AXLE ASSEMBLY

[75] Inventor: Virgil W. Kaiser, deceased, late of Saginaw, Mich., by William J. Kaiser, administrator

[73] Assignee: V. W. Kaiser Engineering, Inc., Millington, Mich.

[21] Appl. No.: 451,935

[22] Filed: Mar. 18, 1974

[51] Int. Cl.² ............................................. B62D 7/18
[52] U.S. Cl. ................................... 280/96.1; 308/109; 308/120 A; 308/240
[58] Field of Search ................ 280/96.1, 96.3; 308/98, 308/106–110, 120 A, 240; 301/124 R

[56] References Cited
U.S. PATENT DOCUMENTS

| 1,370,422 | 3/1921 | Funk | 308/109 |
|---|---|---|---|
| 2,852,322 | 9/1958 | Fisher | 308/240 |
| 3,479,051 | 11/1969 | Weiss | 280/96.1 |
| 3,659,869 | 5/1972 | Hase | 280/96.1 |

Primary Examiner—Robert B. Reeves
Assistant Examiner—Frederick R. Handken
Attorney, Agent, or Firm—Dale Austin Winnie

[57] ABSTRACT

A steering axle assembly for a motor vehicle, including an axle, at least one king pin mounted at one end of the axle, a pivotal steering knuckle having a bore rotatably receiving the king pin, a closure cap mounted on the steering knuckle for closing the bore, and an annular sealing element disposed between the end cap and the knuckle. The end cap includes an annular recess for receiving a portion of the sealing element, a central, lubricant reservoir in alignment with the bore, and a lubricant check valve which permits lubricant to pass only outwardly from the reservoir.

7 Claims, 3 Drawing Figures

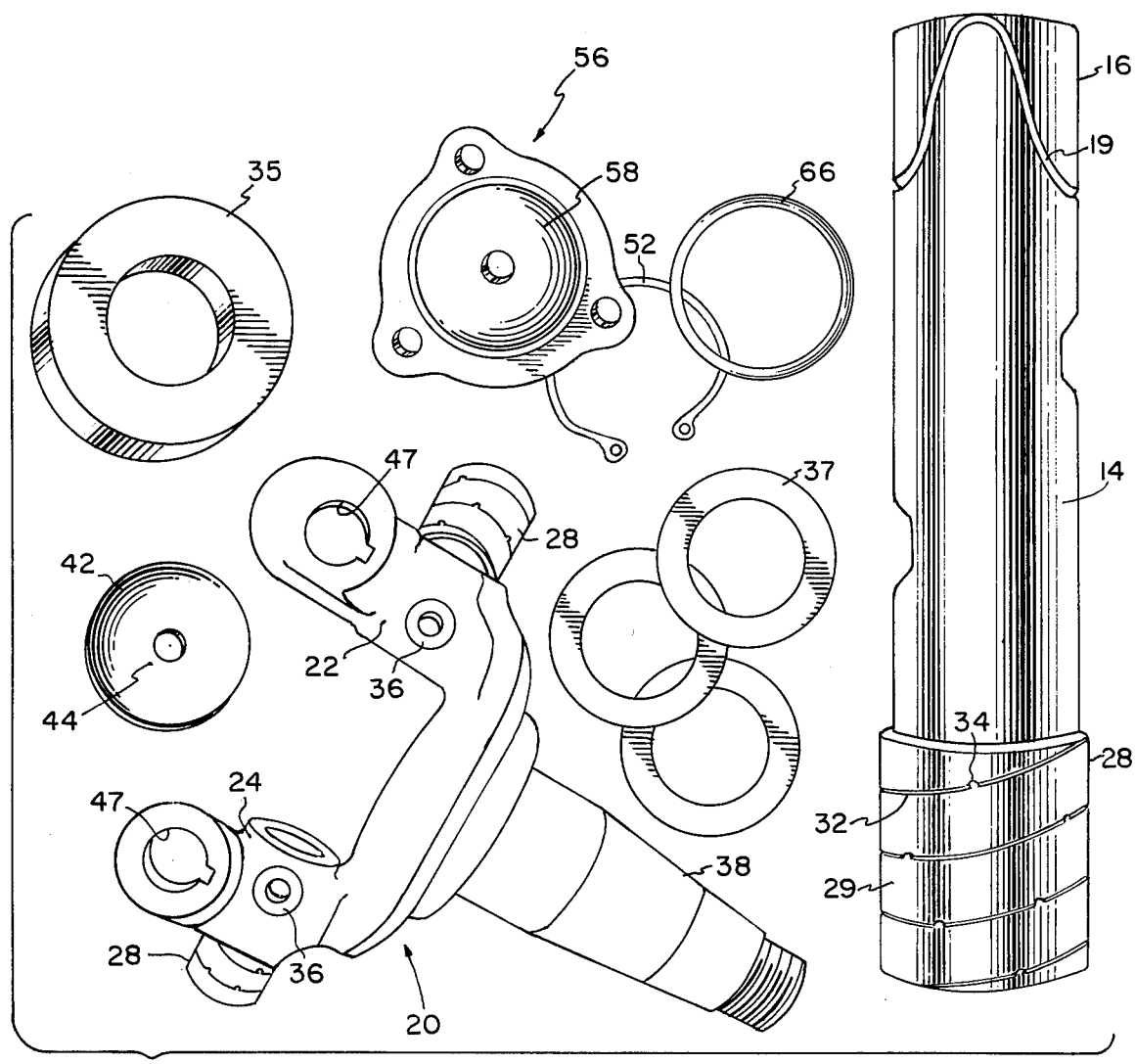
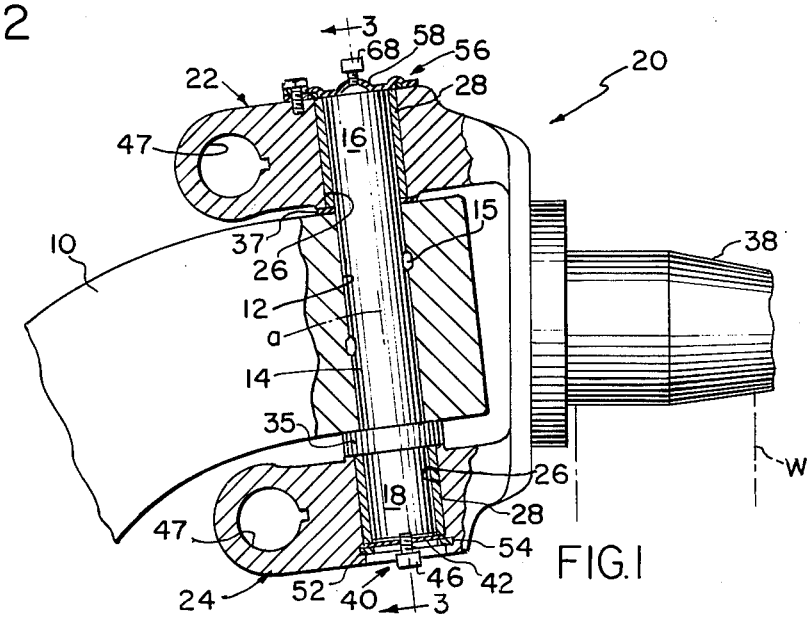

STEERING AXLE ASSEMBLY

BACKGROUND OF THE INVENTION

This invention relates to a steerable axle assembly of the type including steering knuckles pivotally mounted on king pins provided at opposite ends of an axle beam and more particularly to mechanism for insuring proper lubrication thereof.

A steerable axle assembly of the type disclosed herein includes at each end a steering knuckle having upper and lower sections straddling an axle beam and provided with cylindrical bores which receive end pivot portions of a king pin mounted on the axle assembly. Such axle assemblies are known as "reverse Elliott" axle assemblies. Bushings are generally disposed between the king pin pivot portions and the upper and lower knuckle sections. If dirt, water, or other foreign matter is permitted to work into a position between the king pin pivot portions and the bushings in the upper and lower knuckle sections, erosion of these parts is greatly accelerated. Accordingly, it is important that mechanism be provided for sealing the cooperating bearing portions of the steering knuckle and king pin to prevent the ingress of dirt and moisture which contaminates the lubricant and abrades the moving parts.

One type of sealing and lubricating structure comprises end spindle lubricating mechanism including flat cover plates for covering the open ends of the bores in the steering knuckles. "Grease zirks" or lubricant fittings, which comprise check valves, are mounted on the plates for introducing lubricant to the ends of the king pin receiving bores for passage between the king pin and bushings. In the end spindle greasing system, the operator is assured that lubrication process is complete when he observes lubricant passing between the inside of the bifurcated yoke portions and the axle beam. End spindle greasing sometimes causes turbulence in the grease which builds the internal pressure to such a level that it damages or "pops" the bearing seals.

Another type of steerable axle assembly includes a knuckle incorporating side spindle lubrication fittings at the side of the knuckle assembly for introducing lubricant to the pivot pin receiving bores therein. In the side spindle greasing system, lubricant is admitted to the side of the bores intermediate opposite ends thereof for passage in axially opposite directions toward the opposite ends of the bifurcated yoke portions. If the outer bore end remains uncovered, dirt, water, and other foreign matter may enter and corrode and erode the parts. If closure plates are used to completely close the outside ends of the knuckle bores, the operator has no assurance that the outer king pin ends are completely lubricated. It is not unusual for the lubricator to erroneously interrupt the lubrication process as soon as he has observed lubricant passing between the inside of the yoke portions and the axle beam. When lubrication is so interrupted, the outer ends of the king pivot pin portion and the bushings may not be fully lubricated in which case wear of the pivot pins and bushings remote from the beam would quickly erode, necessitating an early replacement of the parts. Apparatus constructed according to the present invention includes an end plate provided with a check valve which permits lubricant to pass only outwardly from the outer ends of the king pin receiving bores. With such a system, the operator, upon seeing the lubricant pass through the check valves, can be certain that lubricant has passed completely to the outer ends of the king pin and yet the king pin is protected from dirt entering via the outer ends of the bore.

In the system disclosed herein, an end plate is aligned with each knuckle bore and an annular seal is provided between each end plate and the knuckle to prevent the escape of lubricant therebetween. The plate could be substantially flat but then the knuckle must include a recessed portion adjacent the bore to receive a portion of the annular shaft seal so that lateral movement of the seal perpendicular to the axis of the bore is prohibited. Such machining of the knuckle is expensive. Accordingly, it is an object of the present invention to provide an end cap having an annular recess for receiving a portion of an annular seal which bears against the steering knuckle.

As the bushings and pivot pin portions heat while in use, it is desirable to automatically provide an increased supply of lubricant to the bearing surfaces. The apparatus constructed according to the present invention incorporates an end cap having a lubricant reseervior which receives and stores lubricant when the bearing parts are not heated for supply to the bearing parts as they are used and become hot. Accordingly, it is an object of the present invention to provide a steerable axle assembly of the type described having an end closure plate of the type described provided with a central lubricant reservoir surrounded by an annular recess for receiving an annular sealing element.

It is another object of the present invention to provide a steerable axle assembly of the type described including an end cap having a lubricant reservoir disposed in alignment with the king pin receiving bore and having a check valve lubricant fitting communicating therewith for passing lubricant axially outwardly.

It is a further object of the present invention to provide a steering axle assembly of the type described including a snap type, expansible and retractible disc type plug closing one end of the knuckle bore and being wedged into the wall of the bore to close the bore and including a lubricant emitting check valve which passes lubricant only axially out of the bore.

It is yet another object of the present invention to provide a steering axle assembly of the type described includng a side spindle lubricant introducing system which will include mechanism for providing a positive indication as to when lubrication has been completed.

It is another object of the present invention to provide a steering axle assembly of the type described which will increase the reliability of proper lubrication by unskilled mechanics.

It is yet another object of the present invention to provide a steering axle knuckle assembly of the type described including a lubricant introducing fitting in the side thereof and having an end plate with an annular recess receiving a sealing ring at the junction of the knuckle and the spiral bushing.

These and other objects of the present invention will become apparent to those of ordinary skill in the art as the description thereof proceeds.

SUMMARY OF THE INVENTION

In a steering axle assembly, a pivotal steerable member including a bore therethrough for rotatable receiving a king pin, an annular sealing member, adjacent and surrounding one end of the bore, an end cap overlying the annular resilient sealing member having an annular recess for receiving a portion thereof.

The description may more readily be understood by reference to the accompanying drawings, wherein:

FIG. 1 is a partly sectional, front elevational view of a vehicle axle steering assembly constructed according to the present invention;

FIG. 2 is an enlarged, exploded view of the apparatus illustrated in FIG. 1.

Figure 3:
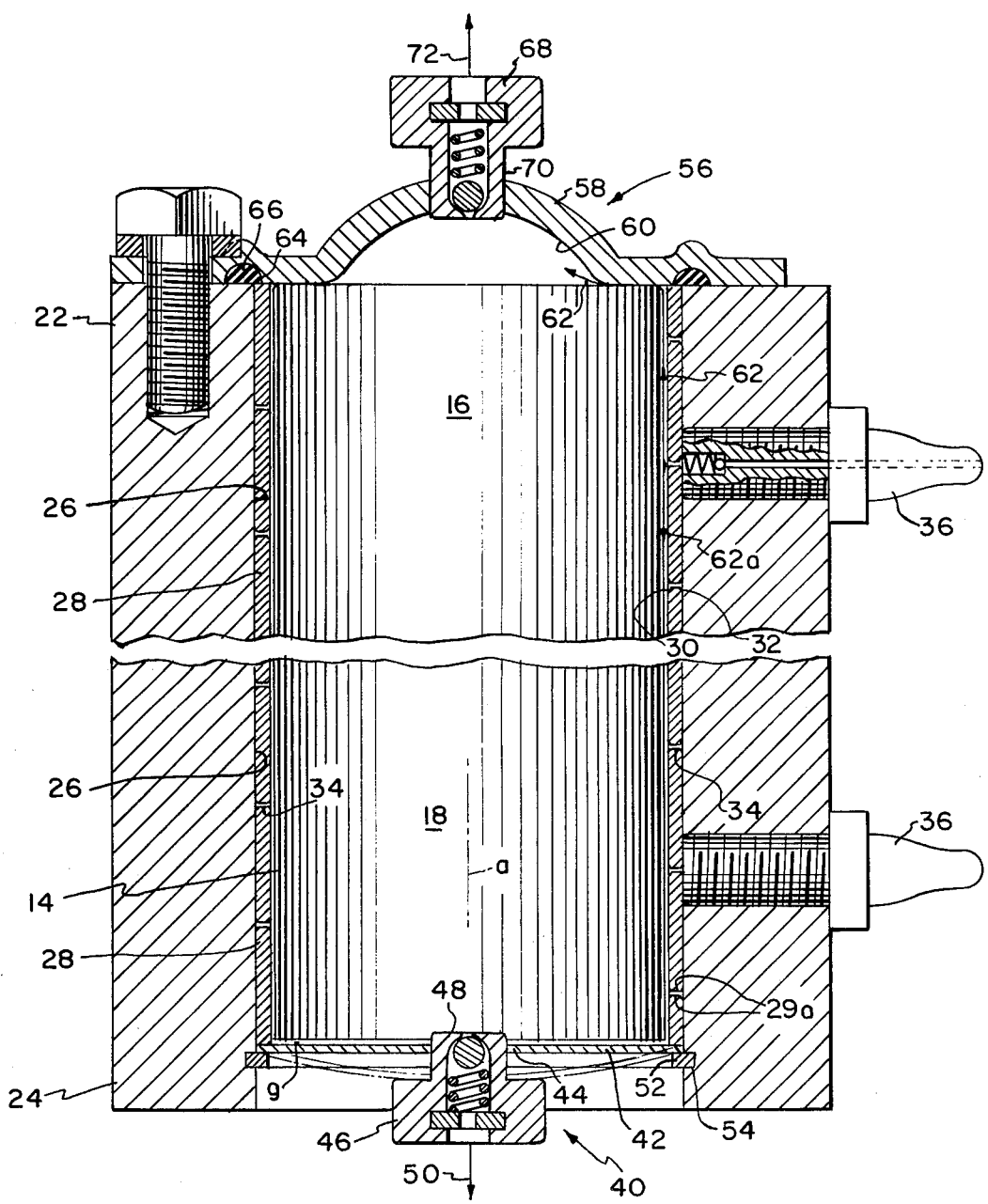
FIG. 3 is a still further enlarged sectional end view, taken along the line 3—3 of FIG. 1.

The axle and steering knuckle assembly disclosed herein includes a rigid, front motor vehicle steering axle or beam, generally designated 10, having king pin receiving bores 12 at opposite ends thereof mounting upstanding king pins, generally designated 14. Each king pin 14 is vertically supported on the beam 10 by keys or taper lock pins 15. The taper lock pins 15 also prevent rotation of the king pin 14 about its vertical axis $a$ which is slightly vertically inclined and upwardly converges toward the axis $a$ of the king pin 14 at the other end of the beam 10. The king pin 14 includes upper and lower end pivot portions 16 and 18, respectively, provided with external, continuous, lubricant receiving, sinusoidal grooves 19 which receive grease, oil, or other lubricant in a manner to be described for passing it axially along the outer king pin surface.

A wheel mounting knuckle, generally designated 20, is pivotally mounted on the king pin and includes upper and lower yoke sections 22 and 24 having upper and lower bores 26, mounting spiral bushings 28. Each spiral bushing 28 includes a helical strip 29 which normally has an outside diameter greater than the internal diameter of the bore 26 and is sprung into engagement with the wall of the bore and thereby held in place. To insert the spiral bushings 28 in one of the bores 26, the bushing is torqued or twisted to a smaller diameter and inserted into one of the bores 26 and then released so that the coiled spiral bushing will spring outwardly into tight engagement with the wall of the bore. The adjacent edges 29a of the spiral strip 29 are internally and externally chamfered to provide upwardly and outwardly converging surfaces which define internal and external spiral grooves 30 and 32 for passing lubricant along the length thereof. A check valve lubricant fitting 36 is provided in the side of each yoke section 22, 24 for introducing lubricant to the external grooves 32. A plurality of helically spaced apertures 34 communicate lubricant from the external grooves 32 to the internal grooves 30 and the side of the spindle or king pin 14. When the spiral bushing 28 is mounted in the bore 26, the adjacent edges 29a of the strip 29 are engaged with each other to provide a "tight wrap" of the spiral bushing and provide a maximum bearing surface for a given axial length.

The knuckle 20 also includes a generally horiziontal, wheel mounting spindle 38 on which a ground-engaging wheel, schematically designated W is journaled, as usual. Annular thrust bearings 35, which receive the king pins 14, are disposed between the lower knuckle yoke sections 24 and the underside of the axle beam 10. Annular shims 37 which receive the king pins 14, are disposed between the upper knuckle yoke sections 22 and the upper side of the axle beam 10 for eliminating end play. A lower bore closure or sealing assembly, generally designated 40, is provided for closing the lower end of the lower bore 26 and includes a disc-type plug 42, which before being installed, is initially concavo-convex, as illustrated in chain lines in FIG. 3. When installed, the plug 42 is securely wedged in place, as illustrated in solid lines in FIG. 3 and moves from the position illustrated in chain lines in FIG. 3, to the position illustrated in solid lines in FIG. 3, to securely wedge in place upon being struck a blow at its central dome portion 44. The disc plug 42 is radially expansible and has an initial diameter less than the diameter of the bore 26 but is expanded outwardly into perimetrical engagement with the wall of the bore when it is moved to the sealing position illustrated in FIG. 3 to prevent the flow of lubricant out the lower end of the lower bore 26.

A lubricant passing check valve 46 of conventional construction is provided and includes a stem 48 threaded into the central portion 44 of the disc plug 42 for passing lubricant axially outwardly only in the direction of the arrow 50. A snap ring 52 is removably received in an internal annular slot 54, provided in the bore 26, for preventing axially outward movement of the disc plug 42 after it is installed. The plug 42, which is normally spaced from the lower end of the king pin 14 by a gap $g$ (FIG. 3), and check valve 46 thus prevents dirt, water and other foreign matter from entering the bore and yet permits lubricant to pass through the lower end thereof so that the operator is provided with a positive indication that the lower end of the pivot portion 18 is adequately lubricated. Tie rods (not shown) are coupled to the openings 47 in the upper and lower yoke portions 22 and 24 to turn the knuckles 20 and the ground engaging wheels W.

Apparatus is provided for sealing the upper end of the bore 26 in the upper yoke section 22 and includes an end cap, generally designated 56 having a central dome portion 58 providing an internal reservoir 60 aligned with the upper end of the king pin 14 for receiving lubricant which passes axially upwardly between the bushing 28 and the shaft 14 in the direction of the arrow 62. The end cap 56 includes an annular groove 64, surrounding the dome portiion 58, receiving the upper portion of a resilient sealing O-ring 66 which may suitably comprise rubber and bridges the upper end of the knuckle portion 24 and the bushing 28 to prevent the passage of lubricant therebetween. A check valve 68 includes a stem 70 threaded into the central dome portion 58 for permitting the axially outward flow of lubricant in the reservoir 60 in the direction of the arrow 72. The check valve 68, of course, prohibits the reverse, axially inward, flow of lubricant, or the passage of dust, water or other bearing contaminants. The passage of lubricant axially outwardly through the check valve 68 provides a positive indicator to the operator that the upper pivot portion is properly lubricated.

The system is lubricated by introducing lubricant, under normal grease gun pressure, to the lubricant fittings 36 which passes to the outer spiral bushing grooves 32 and thence through the ports 34 to the inner spiral bushing grooves 30. Lubricant then passes axially along the grooves 30 and shaft end grooves 19 in the direction of the arrows 62 and 62a to the ends of the bores 26 of each pivot portion 16 and 18. When the lubricant reaches the inner ends of the bores 26 adjacent the axle beam 10, it passes between the beam 10 and the knuckle assemblies 22 and 24 indicating to the operator that the inner ends are adequately lubricated. The operator will continue to introduce lubricant until it passes axially outwardly through the check valves 68 and 46, indicating that lubrication is completed.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. In a steerable axle assembly, a vehicle steering member having a generally vertical cylindrical bore open at both ends, a bushing provided within said bore and comprising a spirally wound bearing strip having an internal spiral groove and aperture means communicating the outer circumferential surface of said bushing with said groove for the passage of lubricant therebetween, said spiral bushing having an outside diameter greater than the internal diameter of said bore for being sprung into retained engagement therewithin, a king pin having a sinusoidal groove provided thereon and received in one end of said bore and within said bushing, means for introducing lubricant to said bore and externally of said bushing, and means for sealing the opposite end of said bore to preclude the passage of lubricant therethrough until said sinusoidal groove, bushing groove and aperture means have been fully packed.

2. The combination as set forth in claim 1, including; said sealing means comprising a metal formed end cap axially aligned with said king pin and having an annular seal receiving recess for relatively spanning the junction of said bushing and said member, annular seal means disposed between said end cap and said member and at least partially received in said annular recess, and means for clamping said end cap to said member for retaining said annular seal means therebetween and precluding lubricant passage thereby.

3. The combination as set forth in claim 2, including; said end cap having a central axially outwardly projecting dome providing an internal lubricant receptive reservoir of predetermined and fixed capacity.

4. The combination as set forth in claim 3, including; means provided centrally within said end cap dome for permitting the passage of lubricant outwardly and precluding the passage of dirt and water inwardly therethrough.

5. The combination as set forth in claim 4, including; said last mentioned means being in threaded engagement with said end cap dome and allowing the passage of lubricant beyond capacity through the thread bearing access therefor.

6. The combination as set forth in claim 1, including; said sealing means comprising a radially expansible and contractible metal formed closure element expanded radially outwardly into perimetrical contact with the walls of said bore and having means in combination therewith for preventing axially outward displacement thereof, and check valve means on said closure element and in combination with said bore for receiving and passing lubricant under pressure outwardly therethrough while precluding the reverse passage of undesirable elements inwardly therethrough.

7. In a steering axle assembly including a vehicle steering axle having a generally vertical cylindrical bore provided therethrough, a king pin member received and retained within said bore with opposite ends extended therebeyond, a steering knuckle member received on the extended ends of said king pin member, and bushing means provided within said steering knuckle member and receptive of the ends of said king pin member therewithin, the improvement comprising; a spirally wound bearing strip formed to provide said bushing means and having an internal spiral groove and aperture means communicating the outer circumferential surface thereof with said groove, a sinusoidal groove provided on the ends of said king pin member which is formed and disposed to intersect the spiral groove of said bushing means as received thereover, and means provided through the side walls of said steering knuckle member for introducing lubricant under pressure into communication with said bushing means for packing said spiral and sinusoidal grooves therewith.

* * * * *